Sept. 18, 1956　　W. P. GREEN ET AL　　2,763,248
GAS ENGINE IGNITION SYSTEM
Filed Nov. 9, 1953
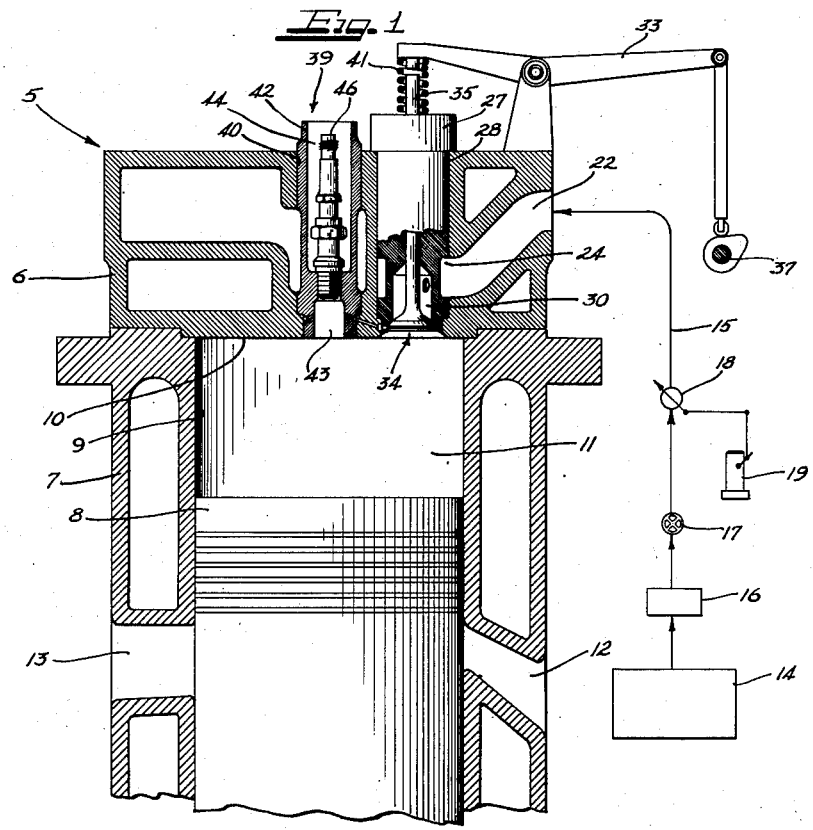
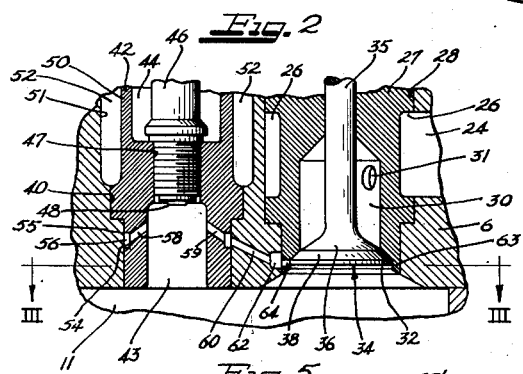
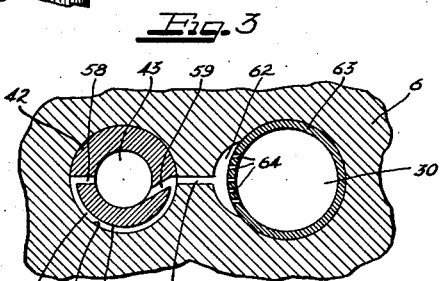
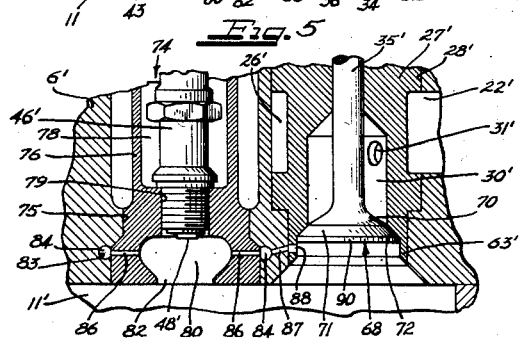
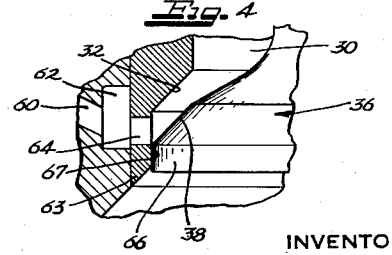
INVENTORS
WILSON P. GREEN
RICHARD W. ROBERTS
BY
ATTY.

United States Patent Office 2,763,248
Patented Sept. 18, 1956

2,763,248
GAS ENGINE IGNITION SYSTEM

Wilson P. Green, Chicago, and Richard W. Roberts, Lombard, Ill., assignors, by mesne assignments, to Fairbanks, Morse & Co., Chicago, Ill., a corporation of Illinois Application November 9, 1953, Serial No. 391,032

9 Claims. (Cl. 123—65)

This invention relates to improvements in fuel ignition apparatus for internal combustion engines, and more particularly to an improved spark ignition system for a two-cycle, high compression gas engine.

In high compression gas engines the gaseous fuel which constitutes the combustion charge in the cylinder, must be a very lean gas-air mixture in order to prevent pre-ignition of the charge. Further, at relatively light engine loads the proportionately reduced gas admission produces mixtures which, while below that energy level tending to result in auto-ignition, vary from the narrow, critical range within which spark ignition can take place, to such an extent that the heat energy of spark discharge is insufficient to cause ignition and combustion of the whole charge. Such lean fuel mixtures are particularly difficult to ignite by means of an electric spark, since an electric spark has a purely localized effect and the resulting initial flame may be quenched by the surrounding lean mixture. Thus, to effectively ignite the combustion charge in the cylinder of a high compression gas engine, auxiliary igniting means must be provided that will assure the production of an ignition flame capable of spreading through the main charge.

The efficient combustion of a gaseous fuel in a two-cycle, high compression gas engine is further hindered by the fact that in two-cycle engines the time available for complete scavenging of the exhausted gases from the cylinder is very brief. Furthermore, since the fuel is not introduced until after the exhaust ports have closed, the time available for intimate mixing of the gas-air combustible charge is also very short. Consequently, the mixture obtained in the cylinder is not a homogeneous mixture, so that the local action of an electric spark is not adequate to assure flame propagation throughout the charge.

Thus, the problem of burning gas in a two-cycle, high compression engine utilizing spark ignition, is essentially one of igniting and burning a gas-air mixture that is lean enough not to pre-ignite, and yet rich enough to ignite and burn in response to suitable and effective igniting means.

It is therefore an important object of the present invention to provide means for producing efficient spark ignition of a gas-air combustion charge in a two-cycle, high compression engine.

Another object of the present invention is the provision of a novel combustion chamber system wherein a portion of the pure gas charge introduced into the cylinder is isolated or stratified in the immediate area of the spark terminals, thereby affording a readily spark ignitable mixture capable of propagating a flame sufficiently to ignite and burn the entire cylinder combustion charge.

A further important object is the provision of an auxiliary combustion cell in which a readily spark ignitable mixture is formed and ignited, the cell being so related to the engine cylinder combustion chamber that the resultant flame issues from the cell into the cylinder chamber and is effective to ignite and burn the fuel-air mixture in the cylinder.

Another object is the provision of an auxiliary combustion cell communicable with the cylinder fuel supply and related to the cylinder combustion chamber such that when fuel is admitted into the cylinder, a charge of concentrated fuel is introduced into the cell and is then diluted by a portion of the cylinder fuel-air mixture during the compression stroke, to a point where the resultant mixture in the cell is readily ignitable by relatively small ignition energy, such as a spark.

According to the general features of the present invention, an auxiliary combustion chamber or cell is arranged in the cylinder head of a two-cycle, high compression gas engine, and is in communication with the cylinder combustion chamber. The cell is connected by suitable passage means to the cylinder fuel supply at or near the inlet valve, in such a manner that when the inlet valve is open, admitting gas to the cylinder chamber, a portion of the gas is directed into the cell. Thus, during the entire period when the inlet valve is open, a proportionately small amount of the gas flowing into the cylinder chamber, is by-passed or directed into the auxiliary combustion cell, thereby isolating a concentrated fuel charge in the cell apart from the lean fuel-air mixture forming in the cylinder.

When the inlet valve is closed, as at a time relatively early in the compression stroke, gas flow both to the cylinder and to the cell ceases. The compression pressure in the cylinder prevents the gas in the cell from entering the cylinder combustion chamber, and during the compression cycle a limited portion of the lean fuel-air mixture present in the cylinder passes into the cell to mix with the gas therein. The shape and volume of the cell relative to the volume of the cylinder, and the compression pressure in the cylinder, determine the quantity of the cylinder charge admitted to the cell as to dilute the fuel charge in the cell sufficiently to result in a cell mixture that is readily ignitable by a relatively low energy ignition means, such as an electric spark. Upon ignition, the relatively rich fuel-air mixture in the auxiliary combustion cell will produce a flame sufficient to ignite and burn the otherwise difficult-to-ignite lean fuel-air mixture obtaining in the cylinder.

Further objects, features, and advantages of this invention will appear or be apparent to one skilled in the art from the following description, reference being made to the accompanying drawings, in which:

Fig. 1 is a fragmentary vertical sectional view taken centrally through an engine cylinder and cylinder head, provided with an auxiliary combustion cell constructed according to the teaching of the present invention.

Fig. 2 is an enlarged fragmentary view of the auxiliary combustion cell and inlet valve of Fig. 1.

Fig. 3 is a horizontal sectional view taken substantially on line 3—3 of Fig. 2.

Fig. 4 is a greatly enlarged fragmentary view illustrating the fuel supply passage to the auxiliary combustion cell and the disposition of the passage relative to the inlet valve.

Fig. 5 is a fragmentary sectional view of a modified auxiliary combustion cell and inlet valve.

Referring now to the drawings, the numeral 5 indicates in general a cylinder assembly of a two-cycle, high compression gas engine, having a cylinder head 6 mounted on a cylinder 7. A piston 8 disposed within the cylinder, cooperates with the inner cylinder surface 9 and the lower surface 10 of the cylinder head to define the combustion chamber 11. Formed in the body of the cylinder are the usual piston-controlled air port means 12 and exhaust port means 13, which are utilized in a well known manner to scavenge the combustion chamber of spent gases while charging the chamber with fresh air.

As shown diagrammatically, 14 is a source of gaseous fuel under pressure for engine delivery over a conduit means indicated by the line 15. Suitably located in the conduit means is a pressure-reduced device 16 of suitable type, a main shut-off valve 17, and a gas throttle valve 18 which is controlled by the usual engine speed responsive governor indicated at 19, such as to determine the amount of gaseous fuel in engine delivery in relation to the power demand on the engine. The pressure-reducer 16 is provided for determining the pressure of the gaseous fuel in engine delivery, at a desired value less than the pressure at the source 14. The line 15 extends to connection with a passage 22 formed in the cylinder head and communicating at its end 24, with an annular recess 26 formed in the external surface of a generally cylindrical valve body 27 disposed in an opening 28 in the cylinder head. A chamber 30 formed in the interior of the valve body 27, is placed in communication with the annular recess 26 by means of a radial bore or passage 31, said chamber opening into the cylinder combustion chamber and providing a tapered valve seating surface 32. A gas admission or inlet valve 34 having a stem 35 guided for reciprocating movement in the valve body 27, is provided with a valve head 36 having a tapered seating face 38 adapted for closure against the valve seat 32. The gas admission valve 34 may be moved to open position for gas delivery into the combustion chamber 11 in timed relation in the engine cycle, by any suitable engine-operated valve actuating means such as the rocker 33 actuated from the engine cam shaft 37. The valve may be returned to closed position by the usual spring mechanism such as spring 41 acting on valve stem 35.

An auxiliary combustion cell assembly 39 is mounted in an opening 40 (Figs. 1 and 2) in the cylinder head, relatively near the inlet valve 34. The cell body 42 has formed therein a lower internal space or chamber 43 defining a combustion cell, which communicates with the cylinder or main combustion chamber 11. The upper portion of the cell body 42 has a hollowed out portion 44 for the reception of a spark plug 46 which may be of standard construction, the spark plug being threaded into an opening 47 in the body member 42 such that the electrodes 48 thereof are exposed in the chamber or cell 43. An annular recess 50 in the external surface of the cell body 42 cooperates with a recessed portion 51 of the cylinder head to form a cooling chamber 52, through which cooling fluid may be circulated by any suitable means (not shown). The amount of cooling fluid circulated through the chamber 52 must be such as to effect cell cooling sufficiently to prevent auto-ignition of the relatively rich fuel mixtures that are obtained in the cell.

As can best be seen in Figs. 2 and 3, the cell body member 42 is provided on the outer surface thereof, with a semi-annular recess or groove 54, said groove cooperating with wall portion 55 of the cylinder head opening 40 to form a semi-annular passage 56. The passage thus formed is placed in communication with the internal chamber or cell 43 by means of a radial passage 58 and a tangential passage 59 (Fig. 3), said passages being bored angularly extend upwardly from the semi-annular passage 56 in a manner to open toward the uppermost portion of the chamber 43 as for a purpose which will be described later. A passage or bore 60 formed in the cylinder head 11 and communicating at one end with the semi-annular passage 56, extends downwardly therefrom (Fig. 2) toward the inlet valve 34 to termination at the other end in a recess or cavity 62, said cavity being formed adjacent the outer surface of the valve body 27 and extending slightly below the valve seat 32. A valve skirt portion 63 of the valve body 27 is provided with transverse bores or passages 64 which, in a manner to be described, communicate the cavity 62 with the valve chamber 30 whenever the inlet valve 34 is opened for gas admission to the cylinder combustion chamber 11.

As best seen in Fig. 4, the valve head 36 is provided with a perpendicular marginal face portion 66 of annular extent, which is formed adjacent to and below the valve face 38, said face portion 66 being at times, in sliding contact with the inner surface 67 of skirt portion 63. For the purpose of illustration, the inlet valve face 38 is shown spaced apart from the valve seat 32 (Fig. 4), which would correspond to the position of the valve head 36 immediately subsequent to unseating or opening of the valve, or that position immediately prior to reseating or closing of the valve. In this position of the valve, i. e. unseated but not open to the cylinder combustion chamber 11, communication of the cavity 62 with the valve chamber 30 is effected by means of the transverse skirt passages 64. It is apparent that this communication remains effective even when the valve is open to the cylinder combustion chamber 18, whereas when the valve is closed as to seat the valve face 38 tightly against seating surface 32, said communication ceases.

With the now described ignition apparatus in application to an engine of the high-compression, two cycle type as indicated, and considering the engine in operation, it appears that whenever fuel is admitted into the cylinder chamber 11 a portion thereof is channeled or by-passed to the auxiliary cell 43. When the valve 34 is initially actuated, moving valve face 38 away from valve 32 and while the perpendicular face 66 contacting surface 67 prevents gas flow into the cylinder combustion chamber (Fig. 4), the transverse passages 64 are open to valve chamber 30 thereby placing said chamber in communication with the cavity or recess 62. It is understood that fuel introduced through passage 22 to the valve chamber 30 is under pressure, therefore when the valve is unseated but not open, as regards the cylinder combustion chamber, valve face 38 cooperates with valve seat 32 to direct and deflect fuel through passages 64 into the cavity 62. As best seen in Figs. 2 and 3, the cavity 62 is connected to the semi-annular cell passage 56 by means of bore 60, and gaseous fuel entering said passage will be admitted into the cell chamber 43 by means of passages 58 and 59. Thus, this position of the valve, i. e., unseated but not full open, permits a positive flow of gaseous fuel into the auxiliary cell chamber immediately prior to gas admission into the cylinder chamber.

As before mentioned, the radial passage 58 and tangential passage 59 are inclined upwardly from the semi-annular passage 56 so as to direct the gaseous flow towards the uppermost region of the cell chamber, the tangential passage 59 tending to create a swirling of the fuel while radial passage 58 tends to direct a stream of fuel to the center of the cell in the vicinity of the spark plug terminals 48. The consequent turbulence is suitable for scavenging of the cell chamber and to assure a substantially pure cell gas charge and thus a proper stratification of the fuel during the ensuing compression stroke of the piston.

It is obvious that the above described condition not only occurs immediately prior to the opening of the valve to the cylinder combustion chamber, but also immediately subsequent to closing of the valve to the cylinder chamber, i. e., whenever the valve face 38 is unseated and perpendicular face 66 is in sliding contact with the surface 67. It is apparent that the inner surface 67 of the valve skirt 63 may be of greater or lesser length whereby to correspondingly decrease or increase the amount of fuel that is directed to the auxiliary cell prior to the open, or subsequent to the closed, position of the valve relative to the cylinder chamber 11. It should be noted that even when the valve is full open admitting gaseous fuel into the cylinder combustion chamber, a portion of the fuel will continue to pass through the passages 64, and into the cell chamber 43.

Fig. 5 illustrates certain modifications in the principal embodiment of Figs. 2 to 4, as to effect gas delivery to the ignition cell coincidentally with gas admission to the engine cylinder, and to provide some appreciable restriction in the communication of the cell with the cylinder combustion space. In the following description of the modified form, parts thereof corresponding to those of the first embodiment of Fig. 2 will be referred to by the same reference numerals, differentiated however by primes.

As shown, this modified structure is carried by the cylinder head in a manner similar to the mounting as described for the preferred embodiment and, except as hereafter described, will operate in a like manner. Referring to Fig. 5, a passage 22' formed in the cylinder head 6' and communicating with suitable fuel supply means (not shown), opens into an annular recess 26' formed in the external surface of a generally cylindrical valve body 27', said valve body being disposed in an opening 28' in the cylinder head. A passage 31' places the recess 26' in communication with a chamber 30' formed in the interior of the valve body. A gas admission valve 68 having a stem 35' guided for reciprocating movement in the valve body 27', has a valve head 70 provided with a tapered face 71 adapted to close against a tapered valve seat 72 of the valve body. As hereinbefore mentioned, the valve is opened and closed in timed relation in the engine cycle by any suitable means (not shown).

An auxiliary combustion cell assembly 74 is mounted in an opening 75 in the cylinder head relatively near the gas admission or inlet valve 68. The cell body 76 is formed to provide an upper hollowed out portion 78 for receiving a spark plug 46', said plug being threaded into an opening 79 in the body member so that the plug electrodes 48' are exposed in a lower internal space or chamber 80 of the cell body. The cell chamber 80 communicates with the cylinder combustion chamber 11' through a restricted opening 82.

A groove 83 formed in the cylinder head 6' and which may be of semi-circular extent, cooperates with the outer surface of cell body 76 to provide a passage 84, said passage communicating with the cell chamber by means of radial passages 86. A bore or transfer passage 87 formed in the cylinder head and communicating at one end with the semi-circular passage 84, terminates at the other end adjacent the outer surface of valve body 27'. A valve skirt portion 63' of the valve body 27' is provided with a transverse passage 88 which, in a manner to be described, affords means for permitting gas to enter the transfer passage 87 whenever the inlet valve 68 is opened for gas admission to the cylinder chamber 11'. As shown, the location of passage 88 relative to the cylindrical margin 90 of valve head 70 in the valve-closed condition, is selected with respect to the extent of valve displacement to the point of opening valve chamber 30' to the main combustion chamber 11', such that the inner edge of the valve head margin 90 will open passage 88 to valve chamber 30' coincidentally with valve opening to the cylinder chamber 11'. Thus, in the gas delivery opening of the valve, gas fuel simultaneously enters the cylinder chamber and passes through passages 88, 87, 84, and 86, into the cell chamber 80.

In the operation of the modified embodiment, whenever fuel is admitted into the cylinder chamber 11', a portion thereof is by-passed or directed to the auxiliary cell chamber 80. Thus, actuation of the inlet valve 68 for gas admission into cylinder chamber 11', results in a small amount of the gaseous fuel being directed through transverse passage 88, and then by means of transfer passage 87 into semi-annular passage 84. The passage 84 is placed in communication with the cell chamber 80 by means of radial passages 86 formed in the body member 76, said radial passages opening into the cell chamber near the uppermost region thereof so as to direct the flow of gaseous fuel toward the center of the chamber in the vicinity of the spark terminals 48'. It is to be noted that due to the relatively shallow depth of the modified cell chamber as compared to that of the preferred embodiment, the radial passages are sufficient to create the turbulence of fuel needed to properly scavenge said chamber.

As shown, the modified cell is formed to provide a restricted opening 82 which retards escape of the rich gaseous fuel into the cylinder chamber 11' when said chamber is being charged, and which also limits the amount of lean fuel-air mixture entering the cell from the cylinder chamber 11' during the piston compression stroke. Consequently, since the amount of lean fuel-air mixture entering the cell from the cylinder is limited, the quantity of pure gas then present in the cell chamber must also be limited accordingly, not only to prevent the formation and pre-ignition of too rich a cell charge, but to assure dilution of the cell charge sufficiently to result in a cell mixture that is readily spark ignitable.

As previously mentioned, the proper dilution of the cell charge is the result of empirically selecting a suitable cell and valve assembly dependent upon the volume and compression pressure of the cylinder as well as the shape of the piston crown. As illustrated by the modified cell and its fuel supply passages (Fig. 5), many modifications are possible within the concept of this invention.

Having now described the invention, what is claimed is:

1. In an internal combustion engine, a cylinder and piston assembly forming a cylinder combustion space and including means for cylinder admission of air, gaseous fuel supply means, means for delivering gaseous fuel from said supply means to the cylinder combustion space, the last said means including a valve chamber having a port for communication with the cylinder combustion space and a gas admission valve in control of said port, a combustion chamber auxiliary to the cylinder combustion space and in communication with the latter, means controlled by said valve for delivering gaseous fuel from the valve chamber to the auxiliary combustion chamber, the gaseous fuel in the auxiliary chamber mixing with gaseous fuel and air entering the auxiliary chamber from the cylinder combustion space, and means effective in said auxiliary chamber for igniting the fuel mixture therein.

2. In combination with an internal combustion engine having a cylinder in which a combustible gaseous fuel is burned, a combustion chamber auxiliary to the engine cylinder and in communication therewith, gaseous fuel admission means for the cylinder including a gas admission valve, passage means for the delivery of gaseous fuel from said admission means to the auxiliary combustion chamber, said passage means being controlled by the gas admission valve, means defining a restricted orifice between said auxiliary chamber and said cylinder, and a fuel igniting means exposed in the auxiliary combustion chamber.

3. In an internal combustion engine, a cylinder and piston assembly forming a cylinder combustion space and providing piston-controlled air intake and exhaust port means, a combustion chamber auxiliary to the cylinder combustion space and in open communication with the latter, gaseous fuel supply means, passage means including a cylinder inlet port, for the delivery of gaseous fuel from said supply means to the cylinder combustion space, a passageway open to said auxiliary combustion chamber and terminating in port means opening to said inlet port, and a gas admission valve controlling gaseous fuel delivery through said port means and inlet port in timed relation in the engine cycle.

4. In an internal combustion engine, a cylinder and piston assembly forming a cylinder combustion space and providing piston-controlled air intake and exhaust port means, an auxiliary combustion chamber adjacent the cylinder combustion space and in communication therewith, gaseous fuel supply means, passage means for delivering gaseous fuel from said supply means to the cylinder combustion space, the gaseous fuel combining with air in the space to form a fuel-air mixture, a gas admission valve in control of said passage means, means controlled by said gas valve and affording communication of the auxiliary combustion chamber with the passage means for the delivery of gaseous fuel to the chamber, and ignition means disposed in said chamber.

5. In a two-cycle, high compression internal combustion engine, a cylinder and piston assembly forming a cylinder combustion space and providing piston-controlled air intake and exhaust port means, means providing a source of gaseous fuel under pressure, a supply connection between said source and the cylinder combustion space, said connection including a cylinder inlet port means and an engine operated control valve operatively associated with said port means for engine-timed admission of gaseous fuel through the port means to the cylinder combustion space, the gaseous fuel in admission to the cylinder combustion space combining with air delivered through the said air intake port means, to form a fuel-air mixture in the space, means forming an auxiliary combustion chamber adjacent the cylinder combustion space and in communication therewith, passage means connecting said cylinder inlet port means and said auxiliary combustion chamber, effective for gaseous fuel admission to the combustion chamber upon port-opening displacement of said control valve for gaseous fuel admission to the cylinder combustion space, a portion of the fuel mixture in the cylinder combustion space entering said auxiliary chamber and mixing with the gaseous fuel therein to form a fuel mixture characterized by ready spark ignitability, and an electric spark discharge device in said auxiliary combustion chamber.

6. In an internal combustion engine providing a cylinder, gaseous fuel supply means, first passage means communicating said supply means with said cylinder, for gaseous fuel delivery thereto, an auxiliary combustion chamber in communication with said cylinder, second passage means between said auxiliary combustion chamber and said first passage means for the delivery of gaseous fuel to said chamber, and an engine-timed valve in control of said first and second passage means.

7. In an internal combustion engine, a cylinder and piston assembly providing a cylinder combustion space, gaseous fuel supply means, means for the delivery of gaseous fuel from said supply means to the cylinder combustion space, the last said means including an inlet port for the cylinder combustion space and an engine-operated valve in control of said inlet port, an auxiliary combustion chamber in communication with said cylinder combustion space, passage means communicating with said auxiliary combustion chamber and extending to said inlet port, provided for delivery of gaseous fuel therefrom to said chamber, and ignition means in a zone of said auxiliary combustion chamber most remote from the zone of chamber communication with the cylinder combustion space.

8. In a two-cycle, high compression internal combustion engine, a cylinder assembly and a piston therein, forming a cylinder combustion space and having piston-controlled air intake and exhaust parts, the cylinder assembly providing a combustion chamber auxiliary to the cylinder combustion space, and a fuel inlet passage opening to the combustion space, gaseous fuel supply means in supply connection to said inlet passage, a by-pass passageway from said inlet passage to said combustion chamber, and an engine-operated valve in control of said inlet passage and by-pass passageway, said valve, inlet passage and by-pass passageway being relatively arranged so that the valve in opening displacement, effects successively, opening of the by-pass passageway to the inlet passage and opening of the inlet passage to the cylinder combustion space.

9. In a two-cycle, high compression internal combustion engine, a cylinder and piston assembly forming a cylinder combustion space and providing piston-controlled air intake and exhaust ports, the assembly including a cylinder head, a combustion chamber in the cylinder head and open to the cylinder combustion space, a member providing a valve chamber in said cylinder head and having a port opening communicating the valve chamber with the cylinder combustion space, said member further providing a valve seat in said port opening, a passageway in the cylinder head communicating with said combustion chamber and extending to said member in the region of said port opening thereof, said member having port means communicating the passageway with said port opening adjacent said valve seat, gaseous fuel supply means in supply connection to said valve chamber, and a gas admission valve carried by said member in operative association with said valve seat, for controlling gaseous fuel delivery from the valve chamber past the valve seat and through said port and said port opening.

References Cited in the file of this patent

UNITED STATES PATENTS

| | | |
|---|---|---|
| 1,271,942 | Ricardo | July 9, 1918 |
| 1,642,579 | Crain | Sept. 13, 1927 |
| 1,750,063 | Sorg | Mar. 11, 1930 |
| 1,782,395 | Bullington | Nov. 25, 1930 |
| 1,791,443 | Clark et al. | Feb. 3, 1931 |
| 2,191,638 | Adams | Feb. 27, 1940 |
| 2,561,598 | Schowalter | July 24, 1951 |